United States Patent [19]
Ehrlich

[11] Patent Number: 5,655,279
[45] Date of Patent: Aug. 12, 1997

[54] HINGE CONNECTION TOOL

[76] Inventor: Michael F. Ehrlich, 740 13th St., Oakmont, Pa. 15139

[21] Appl. No.: 551,165

[22] Filed: Oct. 31, 1995

[51] Int. Cl.⁶ .................................................. B23P 11/00
[52] U.S. Cl. ................. 29/243.5; 29/243.56; 226/85
[58] Field of Search .................. 29/243.5, 243.56, 29/509; 226/85, 86, 75

[56] References Cited

U.S. PATENT DOCUMENTS

| | | | |
|---|---|---|---|
| 3,111,249 | 11/1963 | Lazar | 226/85 |
| 3,284,873 | 11/1966 | Noel | 29/509 |
| 3,528,167 | 9/1970 | Lipp | 29/243.5 |
| 3,722,052 | 3/1973 | Toti | 29/509 |
| 3,875,642 | 4/1975 | Knudson | 29/243.5 |
| 3,972,460 | 8/1976 | Kesinger et al. | 226/85 |
| 4,546,908 | 10/1985 | Cassese et al. | 226/75 |
| 5,146,677 | 9/1992 | Holman et al. | 29/243.5 |

*Primary Examiner*—Timothy V. Eley
*Assistant Examiner*—Lee Wilson
*Attorney, Agent, or Firm*—Webb Ziesenheim Bruening Logsdon Orkin & Hanson, P.C.

[57] ABSTRACT

A tool for attaching a flexible hinge member to the edge of at least one finished end of a wall panel. The tool includes at least one guide member and a first roller assembly carried on the guide member. The first roller assembly includes a first roller having at least one annular groove formed therein. A second roller assembly is carried on the guide member and is spaced from the first roller assembly. The second roller assembly includes a second roller.

18 Claims, 7 Drawing Sheets

HINGE CONNECTION TOOL

BACKGROUND OF THE INVENTION

1. Field of the Invention

This invention relates generally to the assembly of panels for use in office panel systems and, more particularly, to a tool for connecting flexible hinges to finished ends of the panels.

2. Description of the Prior Art

Figure 1:
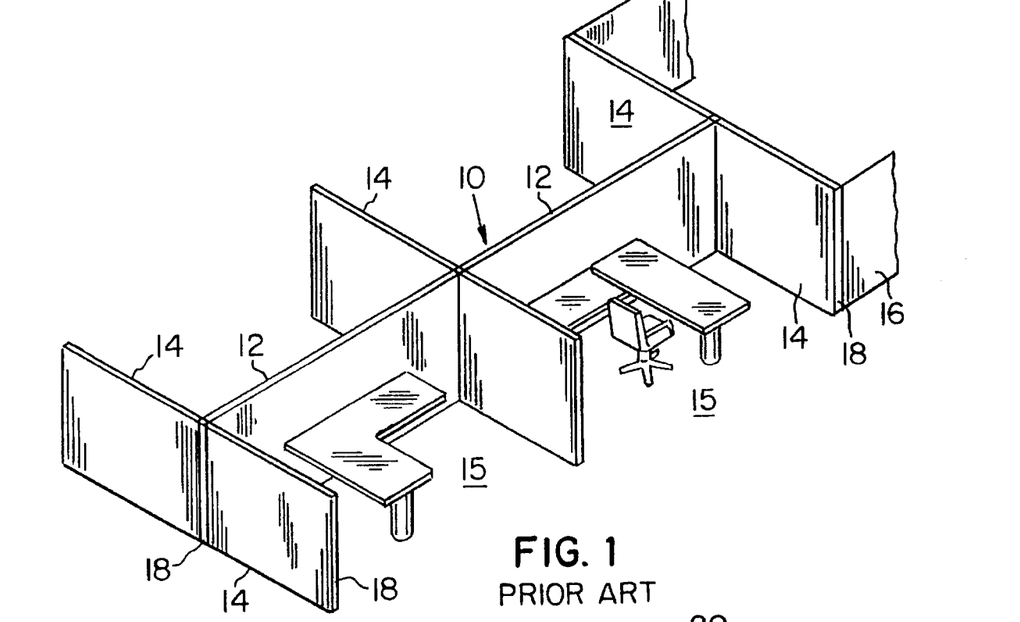
FIG. 1 is a perspective showing an office panel system.

Panel systems are very popular in modern offices since they allow large areas to be aesthetically and economically subdivided into individual work areas. An example of such a system is shown in FIG. 1 of the drawings. A central spine 10 is formed by a series of individual panels 12 connected end to end. At various locations along the spine 10, other panels 14 are connected at right angles to the panels 12 of the spine 10 to form individual work units 15. As shown on the right-hand side of FIG. 1, additional panels 16 may be connected to the outer ends of the partition panels 14 to form larger office units.

A popular office panel system is made by Steelcase Inc. of Grand Rapids, Mich. In the Steelcase system, the ends of adjacent panels are connected by removable finished ends 18 attached to the panel end rails by means of a jack bolt connection (not shown).

Figure 2:
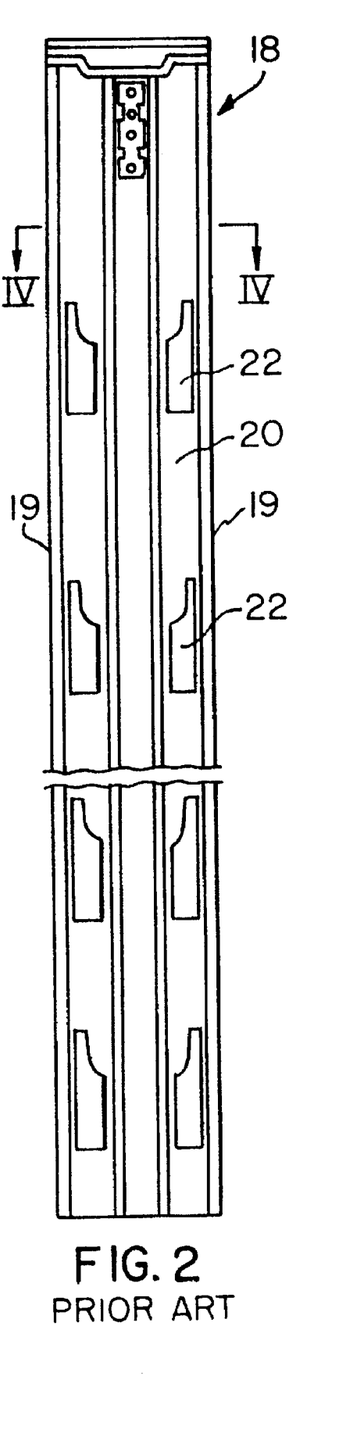
FIG. 2 is an elevation of a panel finished end.
Figure 3:
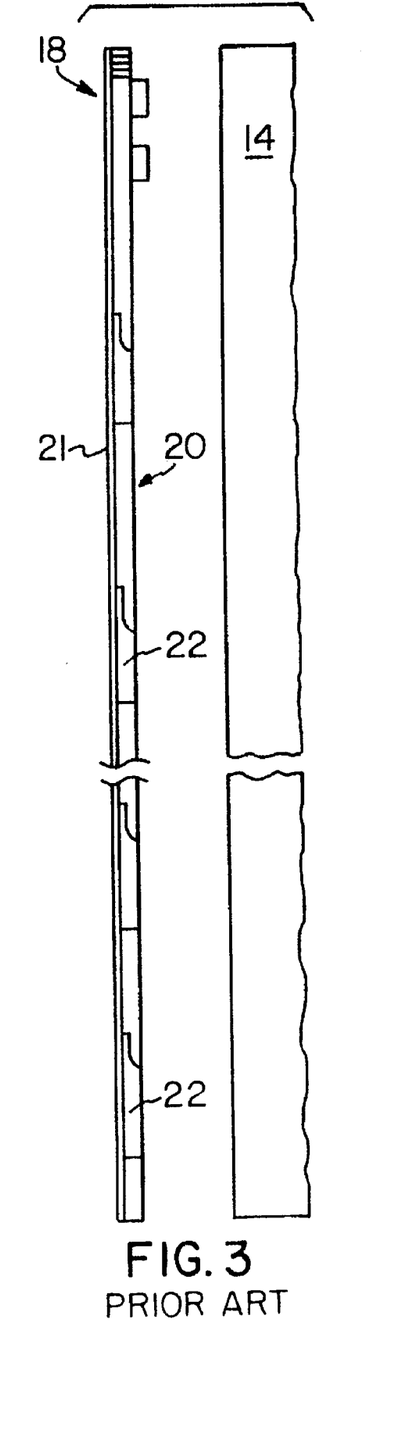
FIG. 3 is a side view of the panel finished end shown in FIG. 2.
Figure 4:
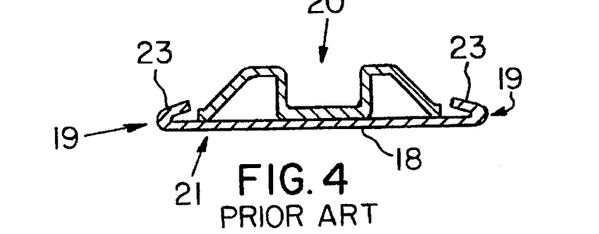
FIG. 4 is a section on line IV—IV of FIG. 2.

A Steelcase finished end 18 is shown in FIGS. 2–4 of the drawings. The finished end 18 is a substantially rectangular elongated metal piece having opposed edges 19, a front face 20, a rear face 21 and a series of longitudinally spaced pairs of engagement slots 22 configured to engage hooks present on the panel end rail. As shown in FIG. 4 of the drawings, the opposed edges 19 of the finished end 18 include a folded portion 23.

Figure 5:
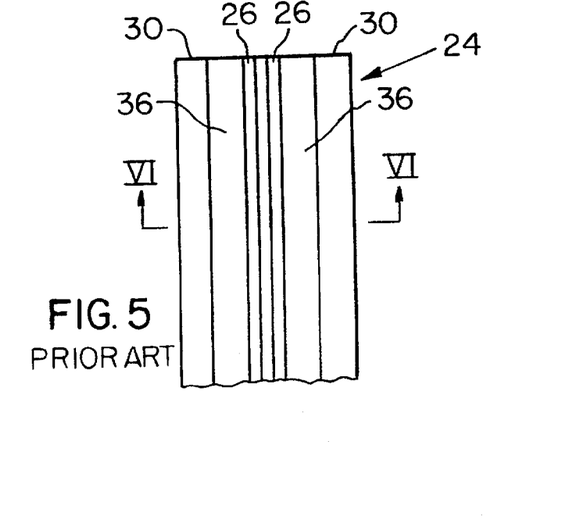
FIG. 5 is an elevation of a hinge member.
Figure 6:
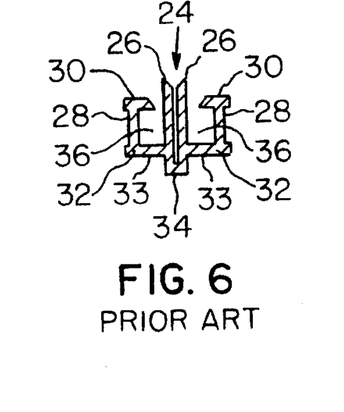
FIG. 6 is an section on line VI—VI of FIG. 5.

When two panels are connected together in an end-to-end relationship, such as the panels 12 forming the spine 10 shown in FIG. 1, flexible hinge members 24, such as shown in FIGS. 5 and 6 of the drawings, are used. The hinge member 24 is made of an elastic material, such as plastic. The hinge member 24 includes two central projections 26 and two side projections 28. Each side projection 28 includes a tip portion 30. The central projections 26 and side projections 28 are carried on a base 32 having an outer surface 33 and a projecting crown portion 34. The central projections 26, side projections 28 and base 32 form two longitudinal channels 36 extending along the length of the hinge member 24.

Figure 7:
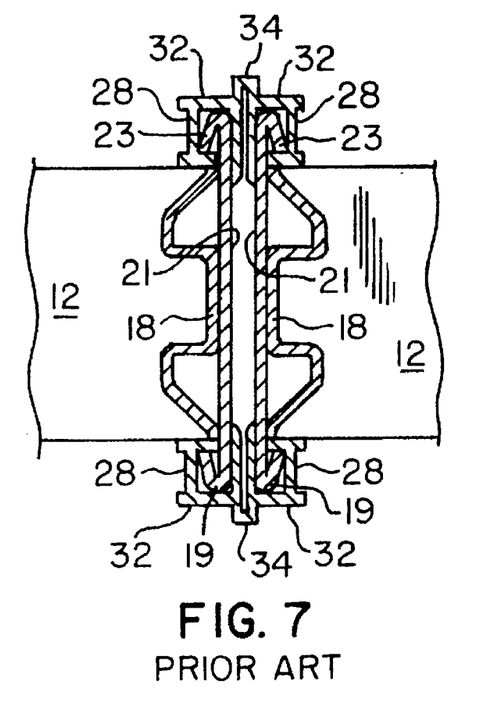
FIG. 7 is section of two panels connected in an end-to-end relationship.

FIG. 7 shows two hinge members 24 connecting two panels 12 in an end-to-end relationship by connecting the adjacent finished ends 18 of the panels 12. Generally, the hinge members 24 are connected to the finished ends 18 before the finished ends 18 are attached to the panels 12. To attach the hinge members 24 to the finished ends 18, the two finished ends 18 are positioned with their rear surfaces 21 adjacent one another and the hinge members 24 are pushed against the edges 19 of the finished ends 18 until the folded end portions 23 of the finished ends 18 are forced into the longitudinal channels 36 of the hinge members 24 along the entire length of each finished end 18. This is typically done by forcing the hinge members 24 onto the finished ends 18 by hand or by using a mallet to pound the hinge members 24 onto the finished ends 18.

Figure 8:
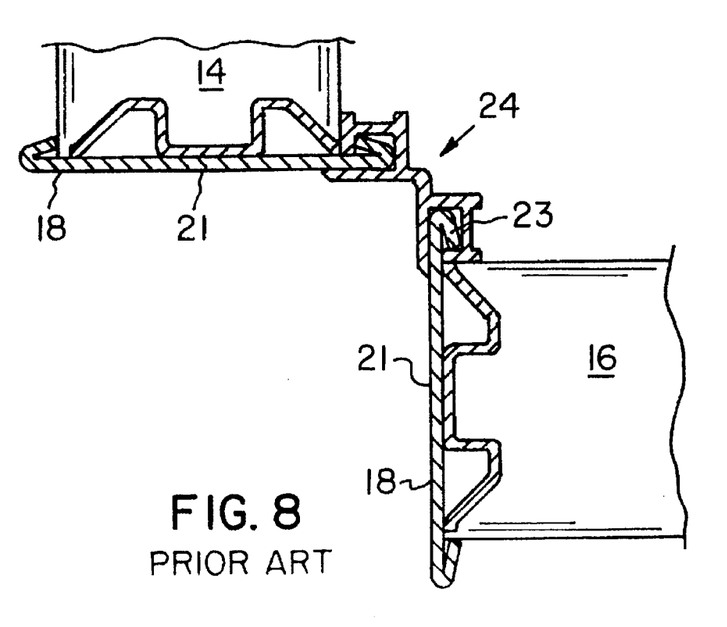
FIG. 8 is a section of two panels connected at a right angle.

FIG. 8 shows a single hinge member 24 connecting two panels 14 and 16 at a right angle, as shown in FIG. 1. To achieve this configuration, the two finished ends 18 are initially positioned as discussed above but only one hinge member 24 is attached to the edges 19 of the finished ends 18. After the hinge member 24 is in place, the two finished ends 18 may be pivoted to open the flexible hinge member 24 for subsequent connection to the end rails of the panels 14 and 16.

It is not uncommon when connecting the hinge members 24 to the finished ends 18, to have one worker designated to force the hinge members 24 onto the required number of finished ends 18 by hand. Although the hinge members 24 are made of a flexible material, it is very difficult to force the edges 19 with the folded portions 23 into the channels 36 by hand, especially when the hinge members 24 are new. The attachment of the hinge members 24 to the finished ends 18 is thus very time consuming when done by hand. Also, workers with this job frequently complain of soreness and pain in their hands and wrists caused by continually forcing the folded portions 23 of the finished ends into the channels 36. Thus, these workers must take frequent breaks thereby increasing the time required to complete the assembly.

As an alternative to forcing the hinge members 24 and finished ends 18 together by hand, these elements are sometimes connected by aligning a hinge member 24 with the finished ends 18 and then striking the crown portion 34 of the hinge member 24 with a hammer or other heavy object to pound the hinge member 24 onto the edges 19 of the finished ends 18 to force the edges 19 of the finished ends 18 into the channels 36. However, this assembly method is also very time consuming and tiring for the worker. For the installation of a panel system in a large area, it is not uncommon to require the attachment of hundreds of hinge members 24 to finished ends 18. Thus, to date the task of attaching one or two hinge members 24 to the required number of finished ends 18 to construct an office panel system has been a very labor intensive and time consuming operation.

Therefore, it is an object of the invention to provide a portable, easy to operate tool which may be used to quickly and reliably attach one or more hinge members to the finished ends of panels. Particularly Steelcase panels for use in an office panel system.

SUMMARY OF THE INVENTION

A tool for attaching a flexible hinge member to an edge of at least one finished end of a panel. The tool includes at least one guide member and a first roller assembly carried on the guide member. The first roller assembly includes a first roller having at least one annular groove located therein. A second roller assembly is carried on the guide member and is spaced from the first roller assembly. The second roller assembly includes a second roller, wherein the hinge member is forced onto the edge of the finished end of a panel by the contact with the rollers.

A complete understanding of the invention will be obtained from the following description when taken in connection with the accompanying drawing figures wherein like reference characters identify like parts throughout.

DESCRIPTION OF THE PREFERRED EMBODIMENTS

Figure 9:
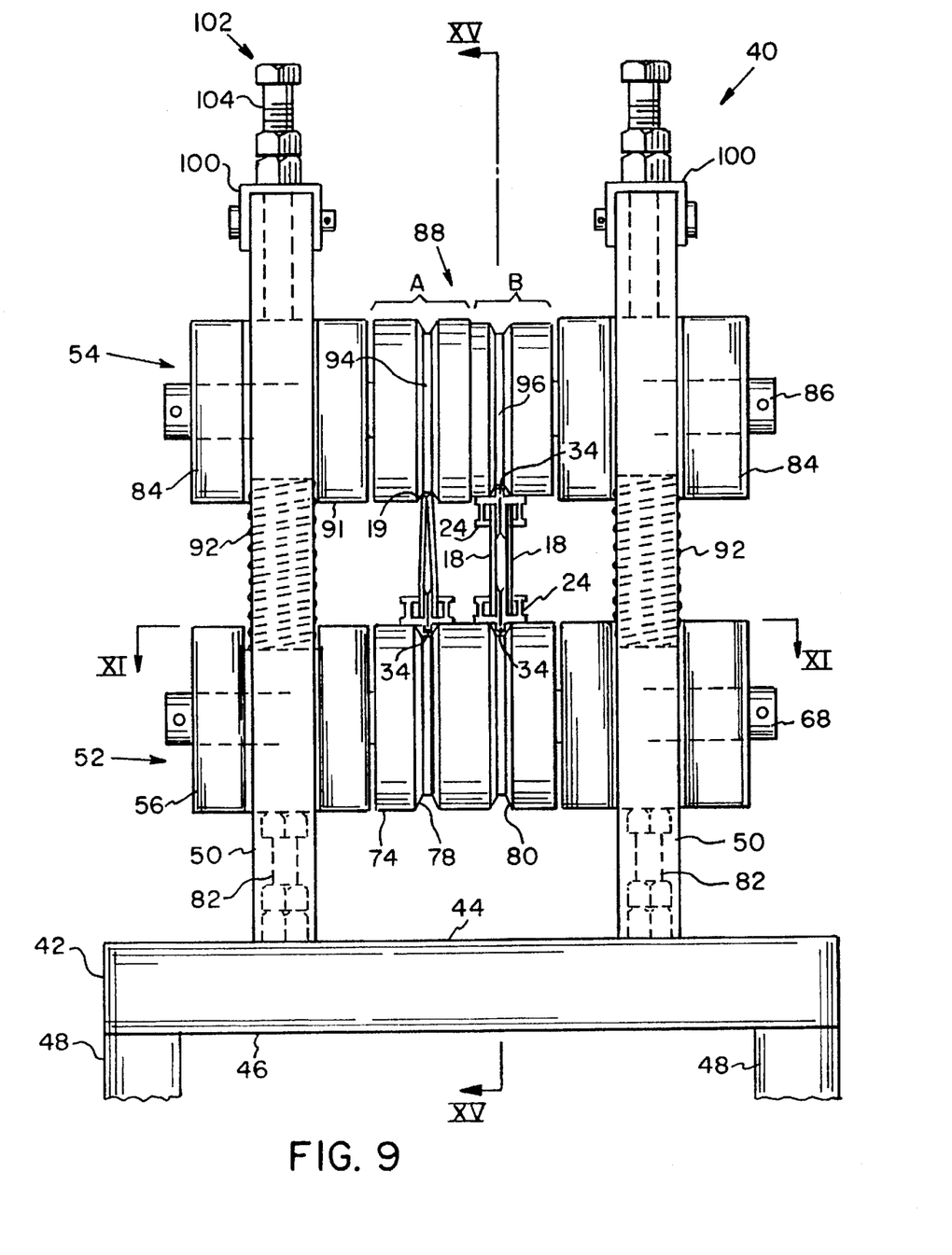
FIG. 9 is a front view of a hinge connection tool.
Figure 10:
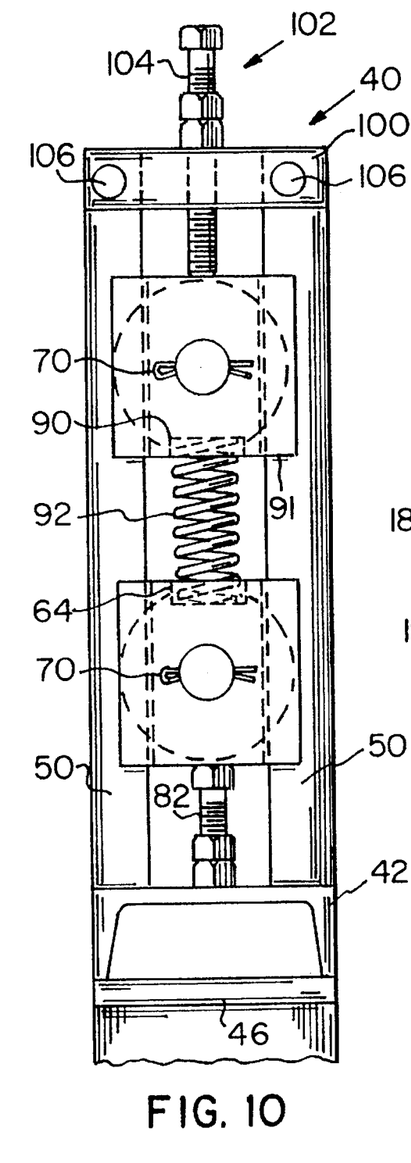
FIG. 10 is a side view of the hinge connection tool shown in FIG. 9.

A hinge connection tool of the invention is generally designated 40 in FIGS. 9–15 of the drawings. A first embodiment of the hinge connection tool 40 is shown in FIGS. 9–12 of the drawings. As shown in FIGS. 9 and 10, the connection tool 40 includes a substantially rectangular metal base 42 having a substantially planar upper surface 44 and a lower surface 46. Four legs 48 depend from the lower surface 46 of the base 42 to support the tool on a bench or on the floor during operation. Four metal guide members 50 are attached to the upper surface 44 and extend substantially perpendicularly therefrom. A first or lower roller assembly 52 and a second or upper roller assembly 54 are slidably carried between the guide members 50.

Figure 11:
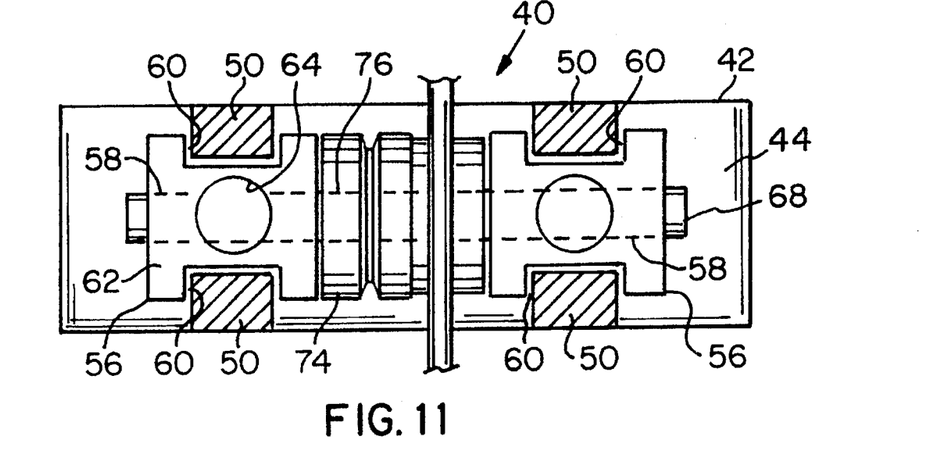
FIG. 11 is a section on line XI—XI of FIG. 9.

As shown in FIGS. 9 and 11, the lower roller assembly 52 includes a pair of substantially H-shaped first or lower support blocks 56 each having a longitudinal bore 58 and a pair of opposed groove portions 60. The guide members 50 fit into the groove portions 60 such that the lower support blocks 56, and hence the lower roller assembly 52, are slidable along the length of the guide members 50. A top surface 62 of each of the lower roller assembly support blocks 56 includes a first circular depression 64 for a purpose explained hereinafter. A first or lower shaft 68 extends through the longitudinal bores 58 of the lower support blocks 56 and is held in place, for example, by cotter pins 70.

As shown in FIGS. 9 and 11, a hardened plastic first or lower roller 74 having an axial bore 76 is rotatably carried on the lower shaft 68 between the lower support blocks 56. The lower roller 74 is substantially cylindrical in shape and includes two axially spaced annular grooves, a first annular groove 78 and a second annular groove 80. A distance adjustment element, for example, a threaded adjustment bolt 82, is located on the upper surface 44 of the base 42 below each lower support block 56.

The upper roller assembly 54 is similar to the lower roller assembly 52 and includes a pair of second or upper support blocks 84, a second or upper shaft 86 extending through the upper support blocks 84 and a second or upper roller 88 rotatably mounted on the upper shaft 86. The upper support blocks 84 include a second circular depression 90 located on the lower surface 91 of each upper support block 84. As shown in FIGS. 9 and 10, a biasing element, such as a coil spring 92, is located between adjacent upper and lower support blocks 84 and 56 with one end of the spring 92 located in the lower circular depression 64 and the other end of the spring 92 located in the upper circular depression 90. Thus, the springs 92 bias the lower and upper roller assemblies 52 and 54 away from each other.

Figure 12:
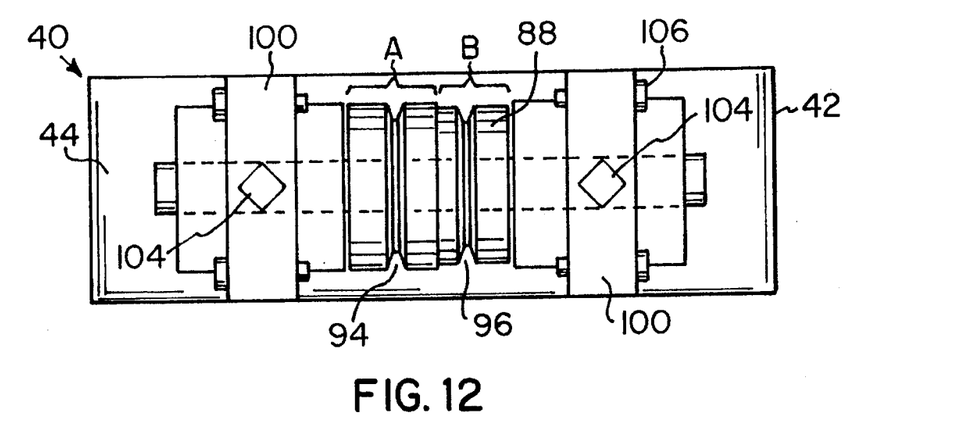
FIG. 12 is plan view of the hinge connection tool shown in FIG. 9.

The upper roller 88 includes two axially adjacent regions, a first region A and a second region B, having differing diameters. As shown in FIG. 9, region A has an annular groove 94 located above and aligned with the annular groove 78 in the lower roller 74 and region B has an annular groove 96 located above and aligned with the annular groove 80 of lower roller 74. As shown in FIGS. 9 and 12, the diameter of region A is larger than the diameter of region B so the distance between the outer surface of the lower roller 74 and the outer surface of region B of the upper roller 88 is larger than the distance between the outer surface of the lower roller 74 and outer surface of region A of the upper roller 88. As shown in FIGS. 9, 10, 12 and 15, a cap member 100 extends between, and is connected to, the upper ends of the opposed guide members 50. Each cap member 100 includes a distance adjustment assembly, such as a set screw assembly 102, having a set screw 104. The set screw 104 passes through the cap member 100. The cap member 100 is attached to the opposed guide members 50 by, for example, bolts 106.

Figure 13:
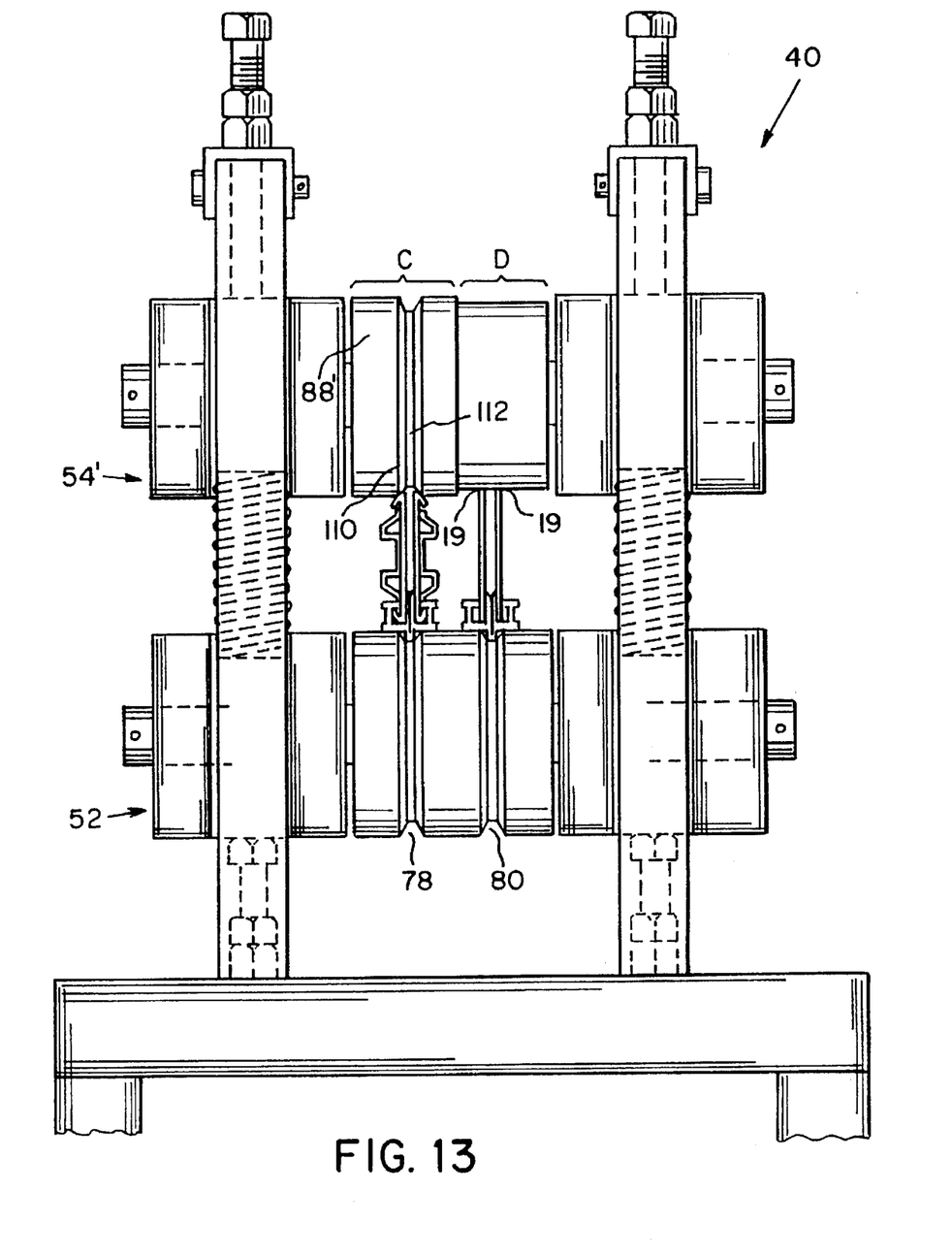
FIG. 13 is a front view of an alternative embodiment of the hinge connection tool.
Figure 14:
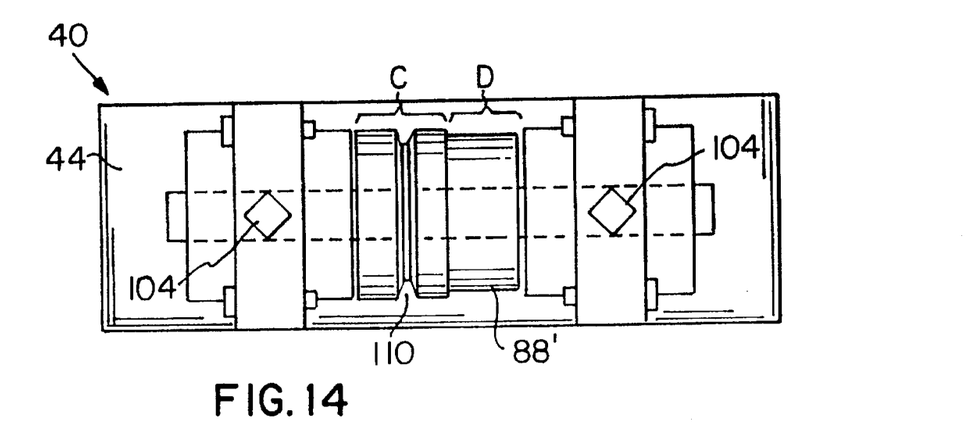
FIG. 14 is a plan view of the hinge connection tool shown in FIG. 13.

The embodiment of the hinge connection tool 40 shown in FIGS. 13 and 14 is similar to the embodiment shown in FIGS. 9–12 but includes a modified second or upper roller 88'. The modified upper roller 88' includes a first region C having an annular groove 110 with a substantially flat bottom 112 located above and aligned with annular groove 78 of the lower roller 74 and a second region D having a smooth outer circumference located above annular groove 80 of lower roller 74. Region D has an outer diameter less than that of region C. While the specific regions A,B and C,D have been shown on different upper rollers 88 and 88', respectively, any combination of the regions A–D may be placed on the upper roller without departing from the scope of the invention.

The operation of the hinge connection tool 40 is now discussed. Operation of the hinge connection tool 40 shown in FIGS. 9–12 will be discussed first. The adjustment bolts 82 are raised or lowered to position the lower roller assembly 52 at a height convenient for use by the operator. Next, the set screws 104 of the set screw assemblies 102 are rotated to adjust the distance between the upper and lower roller assemblies 52 and 54. As the set screws 104 are threaded down through the cap members 100, the bottoms of the set screws 104 contact the upper surfaces of the upper support blocks 84 and thus force the upper roller assembly 54 toward the lower roller assembly 52 against the bias of the coil springs 92.

When connecting a pair of finished ends 18 with two opposed hinge members 24 as shown in FIG. 7, the distance between the lower and upper roller assemblies 52 and 54 is adjusted such that the distance between the outer surface of the lower roller 74 and the outer surface of region B of the upper roller 88 substantially equals the distance between the outer surfaces 33 of the opposed hinge members 24 when attached to the finished ends 18.

Figure 15:
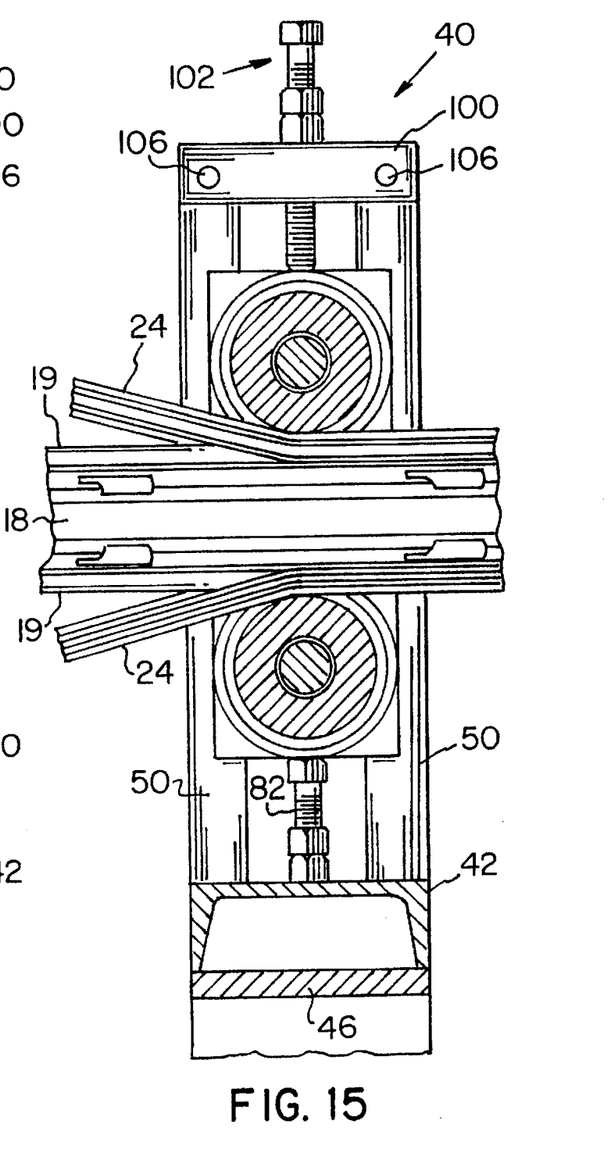
FIG. 15 is a section on line XV—XV of FIG. 9.

In order to attach the two opposed hinge members 24 to the finished ends 18 using the tool 40, a short portion of the length of each of the hinge members 24 near one end of the finished ends 18 is manually attached. This end of the connected finished ends 18 is then placed between the lower and upper roller assemblies 52 and 54, as shown on the right-hand side of FIG. 9, such that the opposed crown portions 34 of the hinge members 24 engage the annular groove 80 in the lower roller 74 and the annular groove 96 in region B of the upper roller 88. The finished ends 18 are then pushed or pulled through the hinge connection tool 40 as shown in FIG. 15. As the finished ends 18 and hinge members 24 move through the connection tool 40, the hinge members 24 are forced onto the edges 19 of finished ends 18 by the compressive force exerted by moving the finished ends 18 between the upper and lower rollers 88 and 74. Thus, the two hinge members 24 may be quickly and easily connected to the finished ends 18 in only a fraction of the time previously required to attach the hinge members 24 to the finished ends 18.

The use of the connection tool shown in FIG. 9 to place a single hinge member 24 on two adjacent finished ends 18 is similar to that described above with respect to placing two hinge members 24 on adjacent finished ends 18 except that region A of the upper roller 88 is used. A portion of the hinge member 24 is attached to one end of the adjacent finished ends 18. This end of the connected finished ends 18 is then placed between the upper and lower roller assemblies 54 and 52 with the crown portion 34 of the hinge member 24 in the annular groove 78 of the lower roller 74 and the non-connected edges 19 of the finished ends 18 in annular groove 94 of the upper roller 88. The finished ends 18 are then pulled or pushed through the tool 40 as described above to force the hinge member 24 onto the finished ends 18 throughout their lengths.

As shown in FIG. 9, the diameter of region B of the upper roller 88 is less than that of region A to accommodate the greater width required for the attachment of two opposed hinge members 24 rather than just one. This difference in diameter means that the tool 40 shown in FIG. 9 can be used for attaching either one or two hinge members 24 to the finished ends 18 without having to constantly adjust the distance between the upper and lower roller assemblies 54 and 52.

The hinge connection tool 40 shown in FIG. 13 is designed specifically for use in attaching a single hinge member 24 to the edges 19 of adjacent cover ends 18. The distance between the upper and lower roller assemblies 54' and 52 is adjusted such that the distance between the outer surface of the lower roller 74 and the outer surface of region D of the upper roller 88' substantially equals the distance between the outer surface 33 of the hinge member 24 and the opposite edges 19 of the finished ends 18. Similarly to the use of the tool 40 described above, a small portion of the hinge members 24 is attached near one end of each of the adjacent cover members 18. This end of the connected finished ends 18 is then placed between the lower and upper roller assemblies 52 and 54' as shown on the right-hand side of FIG. 13 such that the crown portion 34 of the hinge member 24 engages the annular groove 80 on the lower roller 74 and the non-connected edges 19 of the finished ends 18 abut the outer surface of region D of the upper roller 88'. The cover members 18 are then pushed or pulled through the tool 40 to force the hinge member 24 onto the finished ends 18.

Use of region D to attach a hinge member 24 to adjacent finished ends 18 is similar to that described above with respect to region C except that the non-connected edges 19 of the finished ends 18 extend into the flat bottomed annular groove 110 in roller 88'. This keeps the finished ends 18 straight during attachment of the hinge member 24.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A tool for attaching a flexible hinge member to at least one finished end of a panel, said tool comprising:
    at least one guide member;
    a first roller assembly carried on said guide member, said first roller assembly including a first roller;
    at least one annular groove located in said first roller; and
    a second roller assembly carried on said guide member and spaced from said first roller assembly, said second roller assembly including a second roller, wherein said second roller includes at least one annular groove aligned with said at least one annular groove in said first roller.

2. A tool as set forth in claim 1, including a first distance adjustment assembly for adjusting the distance between said first and said second roller assemblies.

3. A tool as set forth in claim 1, including a biasing element extending between said first and said second roller assemblies for biasing said first and said second roller assemblies away from each other.

4. A tool as set forth in claim 1, including a base having an upper surface with said at least one guide member extending substantially perpendicularly from said upper surface of said base.

5. A tool as set forth in claim 1, wherein said first roller assembly includes a first shaft and at least one first support block, said second roller assembly includes a second shaft and at least one second support block, said first roller rotatably carried on said first shaft, said second roller rotatably carried on said second shaft and a biasing element extending between said first and second support blocks for biasing said first and second roller assemblies away from each other.

6. A tool for attaching a flexible hinge member to at least one finished end of a panel, said tool comprising:
    at least one guide member;
    a first roller assembly carried on said guide member, said first roller assembly including a first roller;
    at least one annular groove located in said first roller; and
    a second roller assembly carried on said guide member and spaced from said first roller assembly, said second roller assembly including a second roller,
    wherein said second roller includes a first region and a second region, wherein said first region has a diameter greater than the diameter of said second region, and said first region includes an annular groove aligned with said at least one annular groove of said first roller.

7. A tool as set forth in claim 1, including a plurality of guide members, wherein said first roller assembly includes a plurality of first support blocks slidably carried on said guide members, a first shaft extending through said first support blocks and a first roller rotatably carried on said first shaft and wherein said second roller assembly includes a plurality of second support blocks slidably carried on said guide members, a second shaft extending through said second support blocks and a second roller rotatably carried on said second shaft.

8. A tool for attaching a flexible hinge member to at least one finished end of a panel, said tool comprising:
    at least one guide member;
    a first roller assembly carried on said guide member, said first roller assembly including a first roller;
    at least one annular groove located in said first roller; and
    a second roller assembly carried on said guide member and spaced from said first roller assembly, said second roller assembly including a second roller, wherein said first roller includes a first annular groove and a second annular groove, said second roller includes a first region and a second region with a diameter of said first region greater than the diameter of said second region, and an annular groove located in said first region of said second roller opposed to said first annular groove of said first roller.

9. A tool as set forth in claim 7, including a distance adjustment element located adjacent each said of first support blocks.

10. A tool as set forth in claim 7, including a biasing element located between said first and second support blocks for biasing said first and second roller assemblies away from each other.

11. A tool as set forth in claim 8, wherein said second region of said second roller includes an annular groove opposed to said second annular groove of said first roller.

12. A tool for attaching a flexible hinge member to at least one finished end of a panel, said tool comprising:

a plurality of guide members;

a first roller assembly slidably mounted on said guide members, said first roller assembly including a first shaft and a first roller rotatably carried on said first shaft;

a first annular groove and a second annular groove located in said first roller member;

a second roller assembly slidably mounted on said guide members and spaced from said first roller assembly, said second roller assembly including a second shaft and a second roller, wherein said second roller includes a first region and a second region, wherein said first region has a diameter greater than the diameter of said second region; and an annular groove located in said first region of said second roller aligned with said first annular groove of said first roller.

13. A tool as set forth in claim 12, including a distance adjustment assembly for adjusting the distance between said first and second roller assemblies.

14. A tool as set forth in claim 12, including a biasing element extending between said first and second roller assemblies for biasing said first and second roller assemblies away from each other.

15. A tool as set forth in claim 12, including a base having an upper surface with said guide members extending substantially perpendicularly from said upper surface of said base.

16. A tool for attaching a flexible hinge member to at least one finished end of a panel, said tool comprising:

a base having an upper surface;

spaced opposed guide members extending substantially perpendicularly from said upper surface of said base;

a first roller assembly slidably carried on said guide members, said first roller assembly including a first shaft, a pair of first support blocks having a top surface and opposed groove portions configured to slidably engage said opposed guide members, a first roller rotatably carried on said first shaft and a first depression located in each said top surface of each of said first support blocks, said first roller having a first annular groove and a second annular groove;

a second roller assembly slidably carried on said guide members, said second roller assembly including a second shaft, a pair of second support blocks having a bottom surface and opposed groove portions configured to slidably engage said opposed guide members, a second roller rotatably carried on said second shaft and a second depression located in said bottom surface of each of said second support blocks;

a biasing element extending between each of said first support blocks and said second support blocks and engaging said first and second depressions in said support blocks;

a distance adjustment element located between each of said first support blocks and said base; and a distance adjustment assembly located adjacent each of said second support blocks for adjusting the distance between said first and second roller assemblies.

17. A tool as set forth in claim 16, wherein said second roller includes a first region and a second region having a diameter smaller than the diameter of said first region, and an annular groove located in said first region on said second roller aligned with said first annular groove of said first roller.

18. A tool as set forth in claim 17, wherein said second region of said second roller includes an annular groove aligned with said second annular groove of said first roller.

* * * * *